(12) United States Patent
Chi et al.

(10) Patent No.: US 11,158,912 B2
(45) Date of Patent: Oct. 26, 2021

(54) BUS BAR ASSEMBLY FOR ELECTRODE LEAD BONDING AND BATTERY MODULE INCLUDING SAME

(71) Applicant: LG CHEM, LTD., Seoul (KR)

(72) Inventors: Ho-June Chi, Daejeon (KR);
Kyung-Mo Kim, Daejeon (KR);
Jeong-O Mun, Daejeon (KR);
Jin-Yong Park, Daejeon (KR);
Jung-Hoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 291 days.

(21) Appl. No.: 16/494,658

(22) PCT Filed: Sep. 10, 2018

(86) PCT No.: PCT/KR2018/010572
§ 371 (c)(1),
(2) Date: Sep. 16, 2019

(87) PCT Pub. No.: WO2019/074211
PCT Pub. Date: Apr. 18, 2019

(65) Prior Publication Data
US 2020/0020915 A1 Jan. 16, 2020

(30) Foreign Application Priority Data

Oct. 11, 2017 (KR) .......................... 10-2017-0130918

(51) Int. Cl.
*H01M 50/502* (2021.01)
*H01M 10/0585* (2010.01)
(Continued)

(52) U.S. Cl.
CPC ..... *H01M 50/502* (2021.01); *H01M 10/0585* (2013.01); *H01M 50/20* (2021.01);
(Continued)

(58) Field of Classification Search
CPC ...... H01R 4/4809; H01R 11/288; H01R 4/48; H01M 10/0585; H01M 50/20; H01M 50/543; H01M 50/502
(Continued)

(56) References Cited

U.S. PATENT DOCUMENTS 10,608,227 B2 * 3/2020 Okamoto ............... H01G 11/82
2015/0171399 A1 6/2015 Jeong

FOREIGN PATENT DOCUMENTS

JP 11-25951 A 1/1999
JP 2007-87907 A 4/2007
(Continued)

OTHER PUBLICATIONS

International Search Report issued in PCT/KR2018/010572 (PCT/ISA/210), dated Dec. 11, 2018.
(Continued)

*Primary Examiner* — Edwin A. Leon
*Assistant Examiner* — Paul D Baillargeon
(74) *Attorney, Agent, or Firm* — Birch, Stewart, Kolasch & Birch, LLP (57) ABSTRACT

A bus bar assembly for electrically connecting a plurality of battery cells having electrode leads is provided. The bus bar assembly includes a bus bar support frame having an opening; an insertion bus bar, the insertion bus bar being displaceable relative to the bus bar support frame in the opening; side-adhering bus bars positioned with the insertion bus bar being interposed therebetween to form fitting spaces respectively besides opposite sides of the insertion bus bar so that at least one electrode lead is insertable into each of the fitting spaces; and a support member configured to support the insertion bus bar at a location protruding further from the bus bar support frame than the side-adhering bus bars protrude from the bus bar support frame, the support member being elastically deformable by the insertion bus bar when the insertion bus bar is pressed.

10 Claims, 7 Drawing Sheets

(51) Int. Cl.
  *H01R 4/48*     (2006.01)
  *H01R 11/28*    (2006.01)
  *H01M 50/20*    (2021.01)
  *H01M 50/531*   (2021.01)
  *H01M 50/543*   (2021.01)

(52) U.S. Cl.
  CPC ....... *H01M 50/531* (2021.01); *H01M 50/543* (2021.01); *H01R 4/4809* (2013.01); *H01R 11/288* (2013.01)

(58) Field of Classification Search
  USPC .......................................................... 439/158
  See application file for complete search history.

(56) References Cited

FOREIGN PATENT DOCUMENTS

| | | |
|---|---|---|
| JP | 2013-206844 A | 10/2013 |
| KR | 10-2014-0091102 A | 7/2014 |
| KR | 10-2014-0093424 A | 7/2014 |
| KR | 10-2014-0140744 A | 12/2014 |
| KR | 10-2015-0137840 A | 12/2015 |
| KR | 10-2016-0043038 A | 4/2016 |
| KR | 10-2016-0097013 A | 8/2016 |
| KR | 10-2017-0078359 A | 7/2017 |

OTHER PUBLICATIONS

Supplementary European Search Report mailed in EP Application No. 18866238.1 dated May 29, 2020.

\* cited by examiner

BUS BAR ASSEMBLY FOR ELECTRODE LEAD BONDING AND BATTERY MODULE INCLUDING SAME

TECHNICAL FIELD

The present disclosure relates to a bus bar assembly for joining an electrode lead and a battery module including the bus bar assembly, and more particularly, to a bus bar assembly capable of coupling electrode leads to a bus bar without bending the coupling electrode, and a battery module including the bus bar assembly.

The present application claims priority to Korean Patent Application No. 10-2017-0130918 filed on Oct. 11, 2017 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and an exterior, namely a pouch exterior, sealably containing the electrode assembly together with an electrolyte.

Generally, the lithium secondary battery may be classified into a can-type secondary battery in which an electrode assembly is included in a metal can and a pouch-type secondary battery in which an electrode assembly is included in a pouch made of an aluminum sheet, depending on the shape of the exterior.

Recently, secondary batteries have been widely used not only in small-sized devices such as portable electronic devices, but also in electric vehicles that require a driving power by using internal combustion engines and/or electric motors. The electric vehicles include hybrid electric vehicles, plug-in hybrid electric vehicles, and pure electric vehicles powered only by an electric motor and a battery without an internal combustion engine.

When the secondary batteries are used in the electric vehicle, a large number of secondary batteries are electrically connected to increase capacity and power. In particular, pouch-type secondary batteries are widely used for the middle-sized or large-sized devices since they may be easily stacked. Thus, typically, the battery module/pack of the middle-sized or large-sized device is implemented by connecting the pouch-type secondary batteries in series and/or in parallel.

Figure 1:
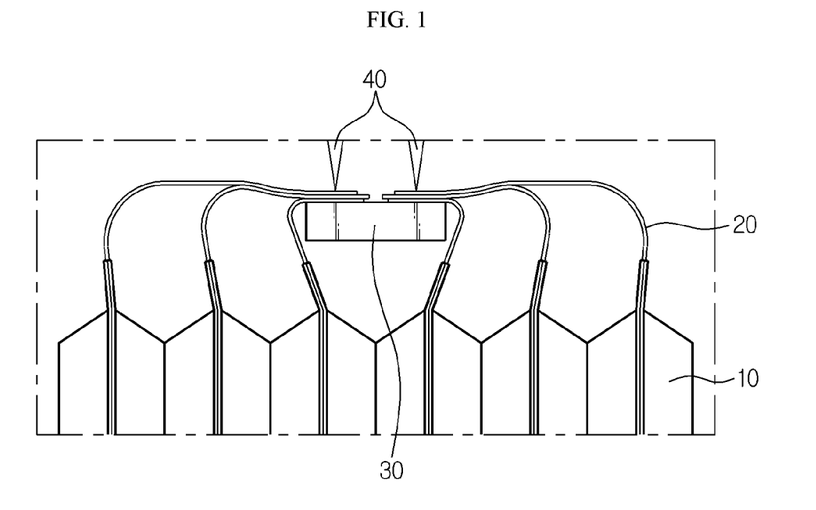
FIG. 1 is a diagram schematically showing a conventional joining configuration of electrode leads and a bus bar.

Meanwhile, when the battery module is configured, electrode leads 20 of a pouch-type secondary battery 10 are bent, as shown in FIG. 1, and brought into contact with an upper end surface of a bus bar, and then joined thereto by welding 40. Here, the bus bar is a rod-shaped conductor made of copper, silver, tin-plated copper or the like and having a rod shape. The bus bar may safely supply a large amount of current to the bus, compared to a copper wire, and thus the bus bar is widely used as a wiring member in a power supply device including a battery module of an electric vehicle.

However, in the conventional technique, a large number of manual operations by a worker are required to maintain the bending shape of the electrode leads 20, and the electrode leads 20 and the bus bar 30 are not easily adhered to each other due to the elastic restoration force of the electrode leads 20 made of a metal material. In particular, when three or more electrode leads are connected in parallel, a plurality of electrode leads should be overlapped on the bus bar, which makes the welding work more difficult and deteriorates the welding quality.

DISCLOSURE

Technical Problem

The present disclosure is directed to providing a bus bar assembly, which may allow electrode leads to be adhered to a bus bar since the electrode leads are coupled to the bus bar without being bent, and a battery module including the bus bar assembly.

However, the objects of the present disclosure are not limited to the above, and objects not mentioned herein may be clearly understood from the present specification by those skilled in the art.

Technical Solution

In one aspect of the present disclosure, there is provided a bus bar assembly for electrically connecting a plurality of battery cells having electrode leads, the bus bar assembly comprising: a bus bar support frame having an opening; an insertion bus bar provided in the form of a rod-shaped conductor, the insertion bus bar being displaceable relative to the bus bar support frame in the opening; side-adhering bus bars positioned with the insertion bus bar being interposed therebetween to form fitting spaces respectively besides opposite sides of the insertion bus bar so that at least one electrode lead is insertable into each of the fitting spaces; and a support member configured to support the insertion bus bar at a location protruding further from the bus bar support frame than the side-adhering bus bars protrude from the bus bar support frame, the support member being elastically deformable by the insertion bus bar when the insertion bus bar is positioned on a same plane as the side-adhering bus bars when the insertion bus bar is pressed.

The support member may be a leaf spring having opposite ends supporting the insertion bus bar, the opposite ends being elastically widenable away from each other when the insertion bus bar is pressed toward the bus bar support frame, and the leaf spring may compress the opposite side surfaces of the insertion bus bar with an elastic restoring force when the insertion bus bar is pressed toward the bus bar support frame.

The insertion bus bar may have a tapered portion in which a width is gradually decreased, the tapered portion being insertable into a space between the opposite ends of the leaf spring.

The insertion bus bar may include a first flat portion provided to face side surfaces of the side-adhering bus bars on the same plane as the side-adhering bus bar; and a second flat portion formed to have a smaller width than the first flat portion, the second flat portion being compressed by the opposite ends of the leaf spring.

The side-adhering bus bars may be provided in a pair so that the pair of side-adhering bus bars are separable from each other, each of the pair of side-adhering bus bars may include an adhering portion provided in parallel to the insertion bus bar and gap adjusting portions bent from opposite ends of the adhering portion and extending therefrom, and the pair of side-adhering bus bars may be disposed symmetric to each other with the insertion bus bar being interposed therebetween to surround a periphery of the insertion bus bar.

The bus bar support frame may have a plate-shaped structure and the opening may be a slit such that each of the electrode leads passes through the slit, the bus bar support frame supporting the insertion bus bar and the side-adhering bus bars.

The bus bar support frame may further include a clamping portion provided at a location opposite to the support member with the insertion bus bar being interposed therebetween to restrain the insertion bus bar.

The bus bar support frame may further include an elastic pressing portion provided to elastically press a side surface of each side-adhering bus bar toward the insertion bus bar.

The bus bar support frame may further include corner brackets configured to surround and support four corner portions of the side-adhering bus bars.

In another aspect of the present disclosure, there is also provided a battery module, comprising the bus bar assembly described above.

Advantageous Effects

According to the present disclosure, it is possible to provide a bus bar assembly, which may couple electrode leads to a bus bar without bending the electrode leads so that the electrode leads and the bus bar are adhered, and a battery module including the bus bar assembly.

In addition, since all of the electrode leads may be welded in a mechanically compressed state, the electrical connection and the mechanical bonding strength reliability may be improved regardless of the number of electrode leads in a parallel connection structure.

Moreover, since the manual process for bending the electrode leads is eliminated, the automation rate of the battery module production line may be improved.

The effects of the present disclosure are not limited to the above, and effects not mentioned herein may be clearly understood from the present specification and the accompanying drawings by those skilled in the art.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

A bus bar assembly 1 according to the present disclosure may mean a component of a battery module that electrically connects electrode leads 20 of a plurality of battery cells 10. However, the present disclosure is not limited to the case where the bus bar assembly 1 is used as a component of a battery module. For example, the bus bar assembly 1 of the present disclosure may be used as a wiring component in a power supply device of a battery module or the like.

Figure 2:
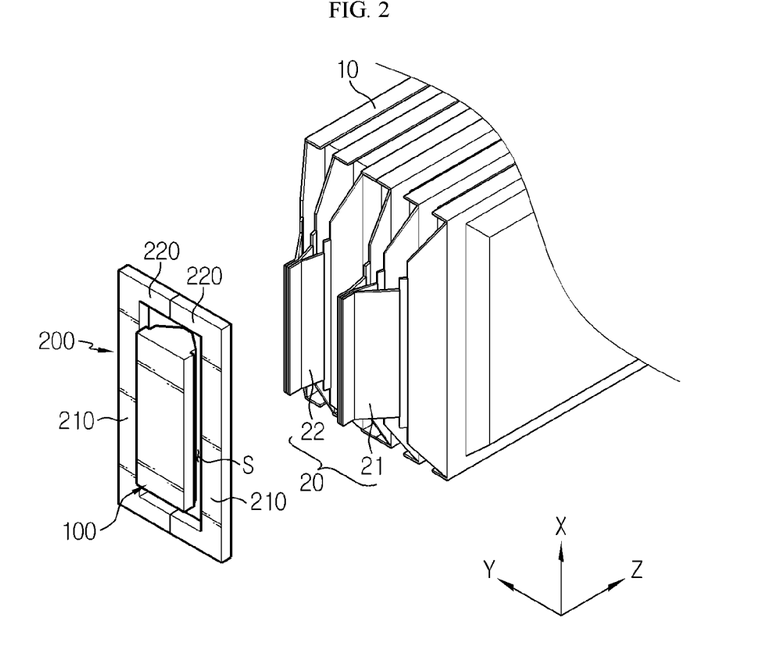
FIGS. 2 and 3 are perspective views schematically showing main components of a bus bar assembly according to an embodiment of the present disclosure and a battery cell stack.
Figure 3:
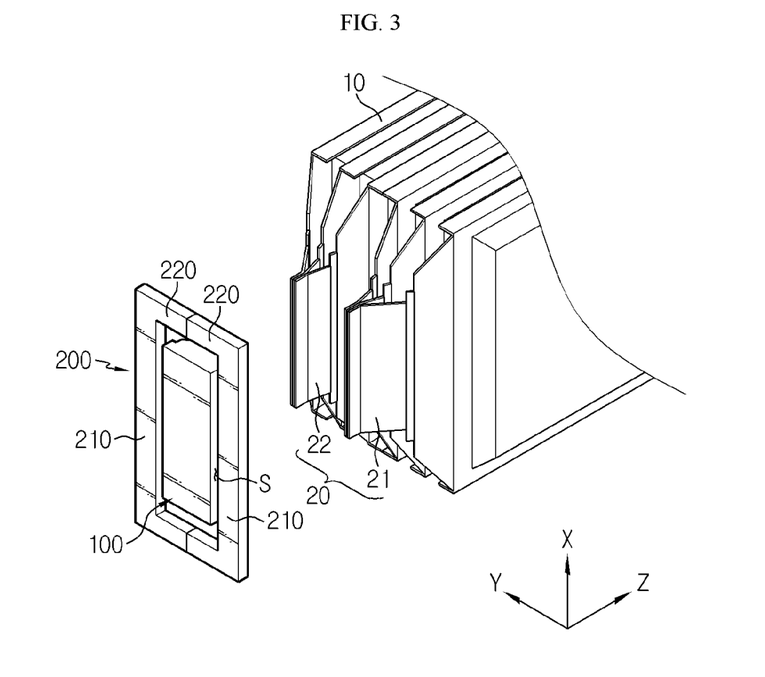
Figure 4:
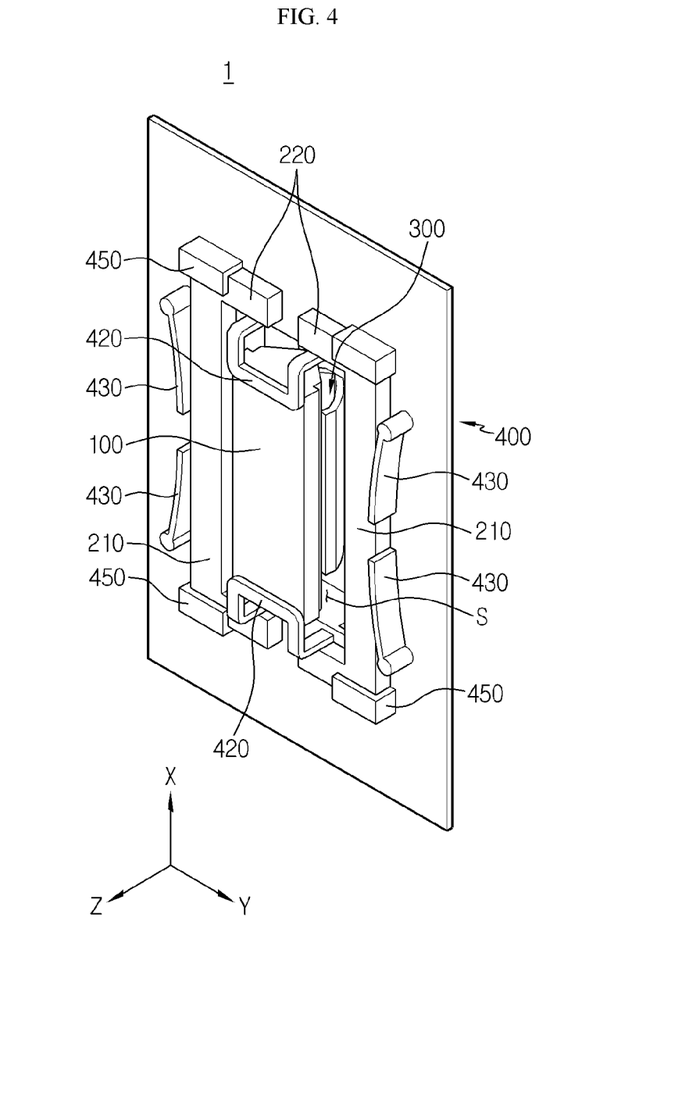
FIG. 4 is a perspective view showing the bus bar assembly according to an embodiment of the present disclosure before the electrode leads are inserted.
Figure 5:
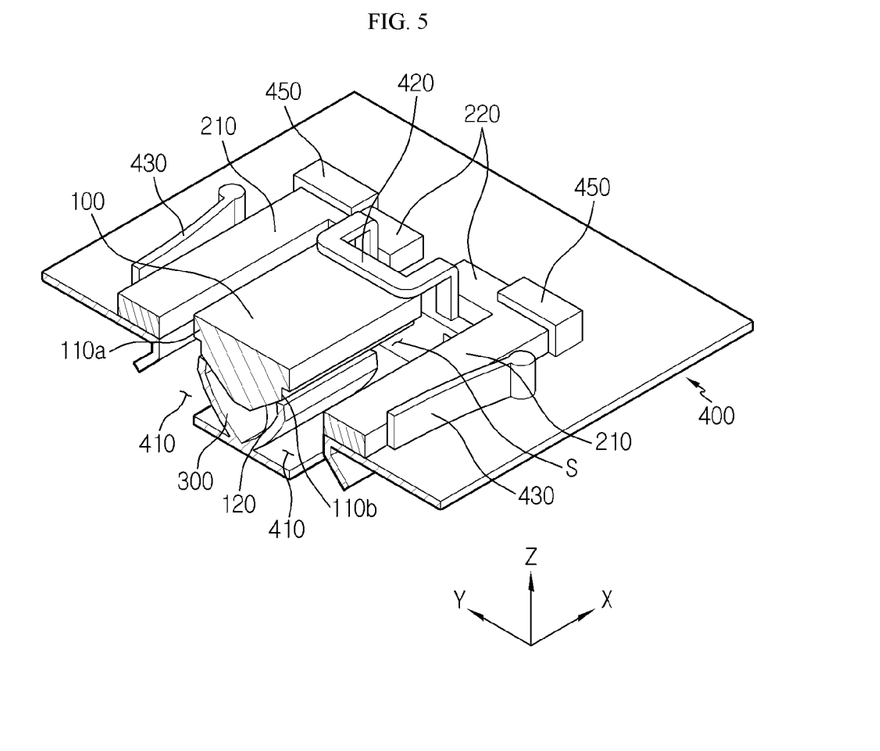
FIG. 5 is a partially sectioned perspective view showing an essential part of FIG. 4.
Figure 6:
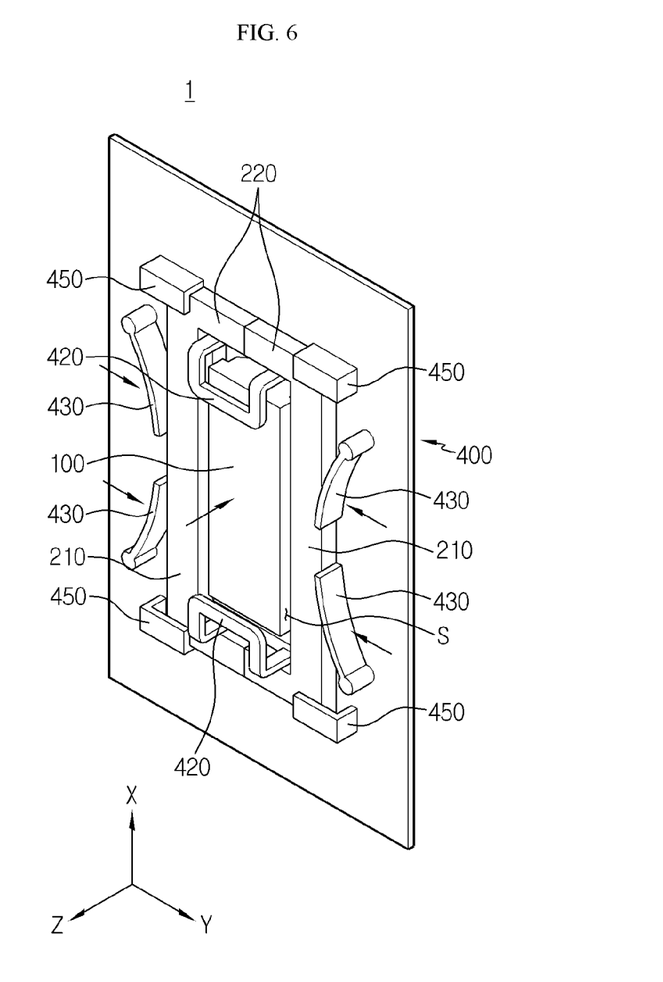
FIG. 6 is a perspective view showing the bus bar assembly according to an embodiment of the present disclosure after the electrode leads are inserted.
Figure 7:
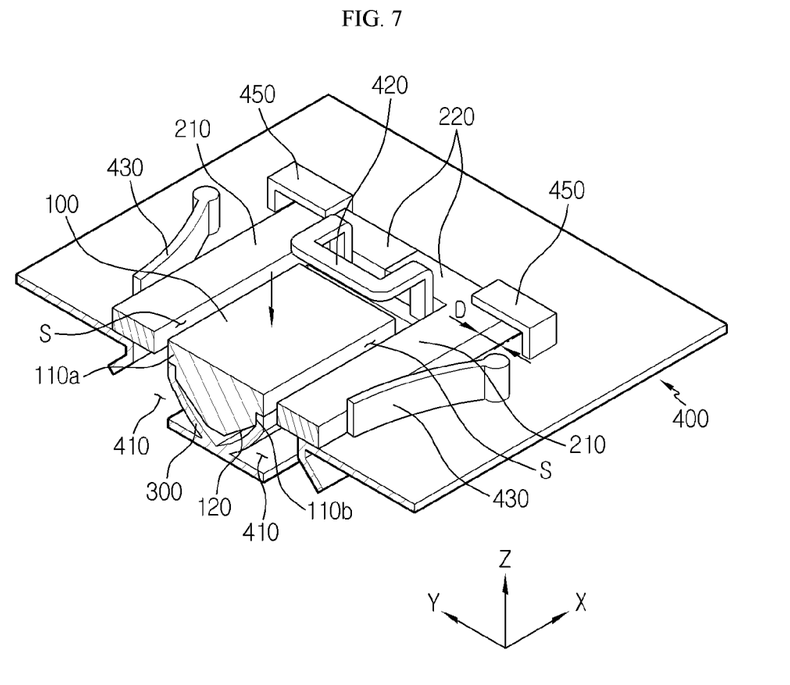
FIG. 7 is a partially sectioned perspective view showing an essential part of FIG. 6.

FIGS. 2 and 3 are perspective views schematically showing main components of a bus bar assembly according to an embodiment of the present disclosure and a battery cell stack, FIGS. 4 and 5 are a perspective view and a partially sectioned perspective view showing the bus bar assembly according to an embodiment of the present disclosure before the electrode leads are inserted, and FIGS. 6 and 7 are a perspective view and a partially sectioned perspective view showing the bus bar assembly according to an embodiment of the present disclosure after the electrode leads are inserted.

Referring to FIGS. 2 to 7, the bus bar assembly 1 according to the present disclosure may include an insertion-type bus bar 100, side-adhering bus bars 200 positioned with the insertion-type bus bar 100 being interposed therebetween to form a fitting space S beside both sides of the insertion-type bus bar 100 so that at least one electrode lead 20 is inserted in the fitting space S, a supporting and holding member 300 configured to support the insertion-type bus bar 100 at a location protruding further to the side-adhering bus bars 200 and provided to be elastically deformable by the insertion-type bus bar 100, and a bus bar support frame 400 configured to give a place where the above components may be assembled and supported.

The electrode lead 20 of the battery cell 10 includes a positive electrode lead 21 and a negative electrode lead 22. As will be described in more detail below, according to the present disclosure, the positive electrode lead 21 and the negative electrode lead 22 are inserted directly into a fitting space S of the bus bar assembly 1 according to the present disclosure, and end portions of the positive electrode lead 21 and the negative electrode lead 22 may be clamped and then welded by the bus bar assembly 1. Thus, it is unnecessary to perform the bending process of the electrode lead 20 as in the prior art, thereby increasing the automation ratio of the production line. Also, according to the present disclosure, the electrode leads 20 may be welded under mechanical compression. Thus, even when two or more electrode leads 20 are joined in parallel, it is possible to maintain the reliability of electrical connection and the mechanical bonding strength.

Hereinafter, the bus bar assembly 1 according to the present disclosure will be described in more detail.

First, the insertion-type bus bar 100 may be made of a rod-shaped material such as copper, silver, and tin-plated copper with electrical conductivity to allow safe passage of high capacity currents. The positive electrode leads 21 and the negative electrode leads 22 may be adhered and welded to the insertion-type bus bar 100 and thus be electrically connected thereto. For example, six battery cells 10 may be connected in total so that three battery cells are connected in parallel therein. As shown in FIGS. 2 and 3, the positive electrode leads 21 of three battery cells 10 are overlapped and the negative electrode leads 22 of the other three battery cells 10 are overlapped and inserted into the fitting space S. Then, end portions of the positive electrode leads 21 and the negative electrode leads 22 are adhered and welded to both side surfaces of the insertion-type bus bar 100 so as to be electrically connected thereto.

The insertion-type bus bar 100 is movable in the (±) directions along the Z axis with respect to the side-adhering bus bar 200 and is supported by the supporting and holding member 300. For example, the insertion-type bus bar 100 is supported at a location protruding further to the side-adhering bus bar 200, and if an external force is applied in the (−) direction along the Z axis, the supporting and holding member 300 supporting the insertion-type bus bar 100 is elastically deformed, and thus the insertion-type bus bar 100 may move onto the same plane as the side-adhering bus bar 200.

In addition, referring to FIGS. 5 and 7, the insertion-type bus bar 100 may include a first flat portion 110a, a second flat portion 110b and a tapering portion 120. The first flat portion 110a, the second flat portion 110b and the tapering portion 120 may be formed continuously along the Z axis.

The first flat portion 110a and the second flat portion 110b may have constant widths, and the second flat portion 110b may have a width smaller than the first flat portion 110a. The first flat portion 110a may be defined as a portion that may be in surface contact with one end of the electrode lead 20, and the second flat portion 110b may be defined as a portion that is pressed by the supporting and holding member 300. The tapering portion 120 may be defined as a portion having a width gradually decreased in the (−) direction along the Z axis.

Since the insertion-type bus bar 100 is narrower at a lower portion thereof in comparison to its upper portion based on the Z axis, it may be understood that the fitting space S is secured wider when the insertion-type bus bar 100 protrudes further to the side-adhering bus bar 200, compared to the opposite case. Thus, in this case, the electrode leads 20 may be easily interposed in the fitting space S. Also, if the insertion-type bus bar 100 is pressed to move downward in the (−) direction along the Z axis after the electrode leads 20 are interposed, the electrode leads 20 may be adhered to the first flat portion 110a of the insertion-type bus bar 100 and the side surfaces of the side-adhering bus bars 200.

Meanwhile, the side-adhering bus bars 200 may have a rectangular frame shape having a hollow space at the center and may form the fitting space S between the side-adhering bus bar 200 and the insertion-type bus bar 100 so that the insertion-type bus bar 100 is interposed between the side-adhering bus bars 200. At this time, the fitting space S may be formed at two places beside both sides of the insertion-type bus bar 100.

In particular, in this embodiment, the side-adhering bus bar 200 may be provided in a pair, and the pair of side-adhering bus bars 200 may be separated from each other. The pair of side-adhering bus bars 200 may include an adhering portion 210 and gap adjusting portions 220 in an approximately "⊂" shape.

More specifically, the adhering portion 210 may be defined as a portion disposed in parallel with the insertion-type bus bar 100, and the gap adjusting portions 220 may be defined as portions extending from the both side ends of the adhering portion 210 toward the insertion-type bus bar 100. The pair of side-adhering bus bars 200 may be disposed symmetrically to each other with the insertion-type bus bar 100 being interposed therebetween to surround an outer periphery of the insertion-type bus bar 100.

At this time, the fitting spaces S may be formed between the two adhering portions 210 and both sides of the insertion-type bus bar 100, so that the gap adjusting portion 220 of one side-adhering bus bar 200 may be in contact with the gap adjusting portion 220 of the other side-adhering bus bar 200. In this case, the pair of side-adhering bus bars 200 may be electrically connected to each other.

Also, since the pair of side-adhering bus bars 200 are separable from each other, as shown in FIGS. 4 and 5, two side-adhering bus bars 200 may be spaced apart in the (±) directions along the Y axis. If the two side-adhering bus bars 200 are spaced apart from each other as above, the fitting space S may be widened further. The two side-adhering bus bars 200 spaced apart from each other may be pressed to come into contact with each other again by an elastic pressing portion 430 of the bus bar support frame 400, explained later, after the electrode leads 20 are interposed in the fitting space S.

Meanwhile, unlike this embodiment, the side-adhering bus bar 200 is configured to form the fitting space S and press the electrode lead 20, so the side-adhering bus bar 200 may not necessarily be made of an electrically conductive material. That is, since the positive electrode leads 21 and the negative electrode leads 22 may be electrically connected using only the insertion-type bus bar 100, the side-adhering bus bar 200 may be made of an insulating material, different from the insertion-type bus bar 100. If the side-adhering bus bar 200 is made of an insulating material as an alternative embodiment, a better effect may be obtained in preventing an electrical short circuit inside the battery module.

The supporting and holding member 300 may be implemented as a leaf spring 300 or a structure having physical properties similar to the leaf spring 300. The leaf spring 300 of this embodiment has both ends that support the insertion-type bus bar 100, and may be provided to be elastically widened to the left and right directions.

More specifically, if the insertion-type bus bar 100 is moved downward in the (−) direction along the Z axis by an external force in a state where the tapering portion 120 of the insertion-type bus bar 100 is supported by both ends of the leaf spring 300, both ends of the leaf spring 300 are widened further to the left and right directions, and the insertion-type bus bar 100 is inserted into the leaf spring 300. The insertion-type bus bar 100 may be moved downward in the (−) direction along the Z axis to a location where the first flat portion 110a of the insertion-type bus bar 100 faces the side surface of the side-adhering bus bar 200.

If the insertion-type bus bar 100 is positioned on the same plane as the side-adhering bus bar 200 as above, both ends of the leaf springs 300 are fit into the second flat portion 110b of the insertion-type bus bar 100 and compresses the second flat portion 110b at both sides of the insertion-type bus bar 100 to fix the insertion-type bus bar 100. At this time, after the external force disappears, the elastic restoring force of the leaf spring 300 acts as a force for pressing both side surfaces of the insertion-type bus bar 100. For example, a welding jig may press the insertion-type bus bar 100 in the (−) direction along the Z axis so that the insertion-type bus bar 100 moves downward and is inserted into the leaf spring 300. Also, after the electrode leads 20 are welded, it is possible to restrain the movement of the insertion-type bus bar 100 by means of the compression of the leaf spring 300 as above in addition to the bonding force with the electrode leads 20 and the pressing force of the side-adhering bus bar 200.

Meanwhile, the bus bar support frame 400 may be attached to the front or rear surfaces of a stack of the battery cells 10. For example, the stack of the battery cells 10 may be accommodated in a module housing (not shown). The module housing may be provided in a tubular shape having open front and rear surfaces, and the bus bar support frame 400 may be coupled to the front and rear surfaces of the module housing and be positioned at the front and rear surfaces of the stack of the battery cells 10.

The bus bar support frame 400 is a plate-shaped structure and has a slit 410 formed between the insertion-type bus bar 100 and the pair of side-adhering bus bars 200 at a location corresponding to the fitting space S so that the electrode lead 20 may pass therethrough. Also, the slit 410 may be provided so that the insertion-type bus bar 100 is movable in the (±) directions along the Z axis, and the side-adhering bus bars 200 may be adhered toward the insertion-type bus bar 100 in the (±) directions along the Y axis.

To this end, the bus bar support frame 400 may further include a clamping portion 420, an elastic pressing portion 430 and a corner bracket 440.

The clamping portion 420 is provided at a location opposite to the leaf spring 300 with the insertion-type bus bar 100 being interposed therebetween to restrain the insertion-type bus bar 100. The clamping portion 420 supports the upper end of the insertion-type bus bar 100 in the (−) direction along the Z axis that is supported to protrude by the leaf spring 300.

In this embodiment, the clamping portion 420 is shaped to be bent at a substantially right angle with respect to the plate surface of the bus bar support frame 400 and is configured to support both end portions of the insertion-type bus bar 100 based on the X-axis direction. Thus, the insertion-type bus bar 100 is partially inserted into the leaf spring 300 and restrained by the clamping portion 420, and then, if an external force is applied thereto, the insertion-type bus bar 100 may be inserted further into the leaf spring 300.

The elastic pressing portion 430 is provided to elastically press both side surfaces of the side-adhering bus bar 200. As described above, the side-adhering bus bar 200 may be configured in a pair so that the pair of side-adhering bus bars 200 are separable from each other, and the pair of side-adhering bus bars 200 may be spaced apart from each other to secure the fitting space S. The elastic pressing portion 430 presses the pair of side-adhering bus bars 200 in a spaced and separated state in the lateral direction, namely in the (±) direction along the Y axis, so that the pair side-adhering bus bars 200 are adhered to each other again.

More specifically, in this embodiment, the elastic pressing portion 430 may be implemented in a plate form having a cantilever structure whose one surface is in contact with the outer surface of the pair of side-adhering bus bars 200. For example, as shown in FIGS. 5 and 7, if the side-adhering bus bar 200 at the right is pulled in the (−) direction along the Y axis, the elastic pressing portion 430 is bent within the elastic range, and then, if the side-adhering bus bar 200 at the right is released, the elastic pressing portion 430 pushes the side-adhering bus bar 200 at the right in the (+) direction along the Y axis while restoring to its original state.

The corner bracket 440 serves to support the pair of side-adhering bus bars 200 while allowing the movement of the pair of side-adhering bus bars 200.

In this embodiment, four corner brackets 440 are provided, and the four corner brackets 450 are positioned at corner portions of the side-adhering bus bar 200 to restrain the side-adhering bus bar 200 movably. Specifically, the corner brackets 440 may be configured to surround four corner portions in a state where the pair of side-adhering bus bars 200 are spaced farthest in both side directions. In other words, the four corner brackets 440 restrain the pair of side-adhering bus bars 200 in upper, lower, left and right directions. Here, for example, a movement allowance space is provided as indicated by D in FIG. 7, so that side-adhering bus bar 200 may move within the movement allowance space of the corner bracket 440.

Figure 8:
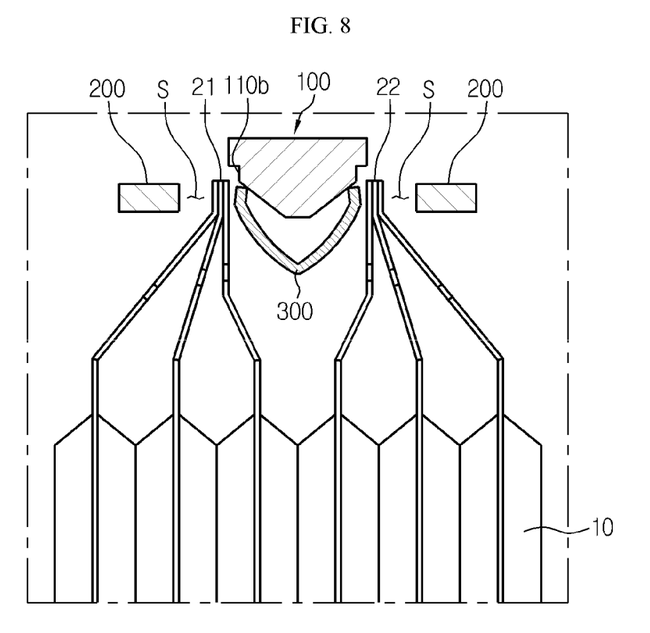
FIGS. 8 and 9 are diagrams showing the configurations before and after the electrode leads and the bus bar assembly are joined according to an embodiment of the present disclosure.
Figure 9:
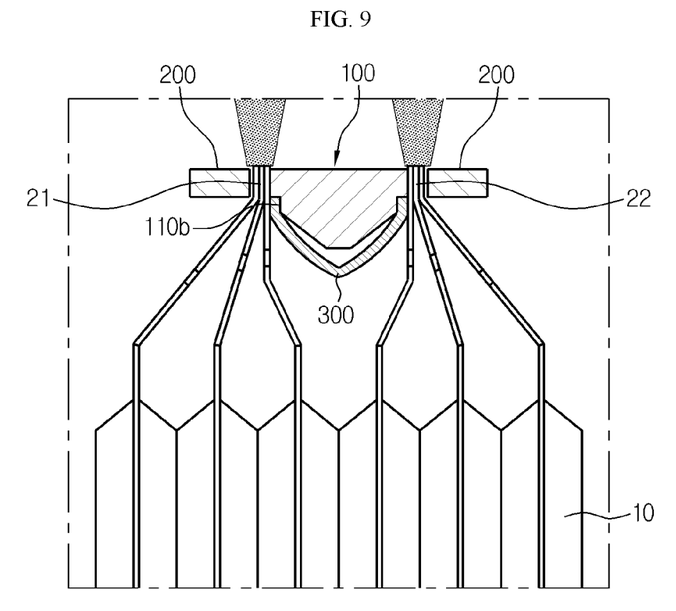

FIGS. 8 and 9 are diagrams showing the configurations before and after the electrode leads and the bus bar assembly are joined according to an embodiment of the present disclosure.

Next, referring to FIGS. 8 and 9, the operation of the bus bar assembly 1 according to the present disclosure and the method of joining the electrode leads 20 will be briefly described. This embodiment is an example in which three battery cells 10 are connected in parallel and the positive electrode leads 21 and the negative electrode leads 22 are joined to the bus bar assembly 1.

First, as shown in FIG. 8, the fitting space S of the bus bar assembly 1 is secured sufficiently. At this time, as described above, the insertion-type bus bar 100 is positioned to protrude further to the side-adhering bus bars 200, and the side-adhering bus bars 200 are spaced apart from each other to secure the fitting space S sufficiently.

Then, the end portions of the positive electrode leads 21 and the end portions of the negative electrode leads 22 are inserted into the fitting space S, respectively. The fitting space S is provided at two places beside both sides of the insertion-type bus bar 100. Only the end portions of the positive electrode leads 21 and the negative electrode leads 22 are inserted into the fitting spaces S in a bundle, respectively.

After that, as shown in FIG. 9, the insertion-type bus bar 100 is moved downward onto the same plane as the side-adhering bus bars 200, and the side-adhering bus bars 200 are adhered, so that the positive electrode leads 21 and the negative electrode leads 22 are compressed between the insertion-type bus bar 100 and the side-adhering bus bars 200. In this state, the positive electrode leads 21 and the negative electrode leads 22 are welded.

According to the structure and operation of the bus bar assembly 1 of the present disclosure, the process of bending the electrode lead 20 used in the prior art (see FIG. 1) is not required at all when the electrode lead 20 is welded. Thus, the manual process for bending the electrode leads 20 may be eliminated to improve the automation ratio of the battery module production line.

In addition, since all of the electrode leads 20 may be welded in a mechanically compressed state, the electrical connectivity and the mechanical bonding strength reliability may be improved regardless of the number of the electrode leads 20 in the parallel connection structure.

Meanwhile, a battery module according to the present disclosure may include the bus bar assembly described above. In addition, the battery module includes a battery cell stack, a module housing for accommodating the battery cell stack, and various devices (not shown) for controlling charging and discharging of the battery cells such as a battery management system (BMS), a current sensor and a fuse. The battery module may be used as an energy source for electric vehicles, hybrid electric vehicles or power storage devices.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or an object to be observed.

What is claimed is:

1. A bus bar assembly for electrically connecting a plurality of battery cells having electrode leads, the bus bar assembly comprising:
a bus bar support frame having an opening;
an insertion bus bar provided in the form of a rod-shaped conductor, the insertion bus bar being relative to the bus bar support frame in the opening;
side-adhering bus bars positioned with the insertion bus bar being interposed therebetween to form fitting spaces respectively besides opposite sides of the insertion bus bar so that at least one electrode lead is insertable into each of the fitting spaces; and
a support member configured to support the insertion bus bar at a location protruding further from the bus bar support frame than the side-adhering bus bars protrude from the bus bar support frame, the support member being elastically deformable by the insertion bus bar when the insertion bus bar is positioned on a same plane as the side-adhering bus bars when the insertion bus bar is pressed.

2. The bus bar assembly according to claim 1,
wherein the support member is a leaf spring having opposite ends supporting the insertion bus bar, the opposite ends being elastically widenable away from each other when the insertion bus bar is pressed toward the bus bar support frame, and the leaf spring compresses the opposite side surfaces of the insertion bus bar with an elastic restoring force when the insertion bus bar is pressed toward the bus bar support frame.

3. The bus bar assembly according to claim 2,
wherein the insertion bus bar has a tapered portion in which a width is gradually decreased, the tapered portion being insertable into a space between the opposite ends of the leaf spring.

4. The bus bar assembly according to claim 2,
wherein the insertion bus bar includes:
a first flat portion provided to face side surfaces of the side-adhering bus bars on the same plane as the side-adhering bus bar; and
a second flat portion formed to have a smaller width than the first flat portion, the second flat portion being compressed by the opposite ends of the leaf spring.

5. The bus bar assembly according to claim 1,
wherein the side-adhering bus bars are provided in a pair so that the pair of side-adhering bus bars are separable from each other,
wherein each of the pair of side-adhering bus bars includes an adhering portion provided in parallel to the insertion bus bar and gap adjusting portions bent from opposite ends of the adhering portion and extending therefrom, and
wherein the pair of side-adhering bus bars are disposed symmetric to each other with the insertion bus bar being interposed therebetween to surround a periphery of the insertion bus bar.

6. The bus bar assembly according to claim 1,
wherein the bus bar support frame has a plate-shaped structure and the opening is a slit such that each of the electrode leads passes through the slit, the bus bar support frame supporting the insertion bus bar and the side-adhering bus bars.

7. The bus bar assembly according to claim 6,
wherein the bus bar support frame further includes a clamping portion provided at a location opposite to the support member with the insertion bus bar being interposed therebetween to restrain the insertion bus bar.

8. The bus bar assembly according to claim 6,
wherein the bus bar support frame further includes an elastic pressing portion provided to elastically press a side surface of each side-adhering bus bar toward the insertion bus bar.

9. The bus bar assembly according to claim 6,
wherein the bus bar support frame further includes corner brackets configured to surround and support four corner portions of the side-adhering bus bars.

10. A battery module, comprising a bus bar assembly defined in claim 1.

* * * * *